Patented Jan. 29, 1946

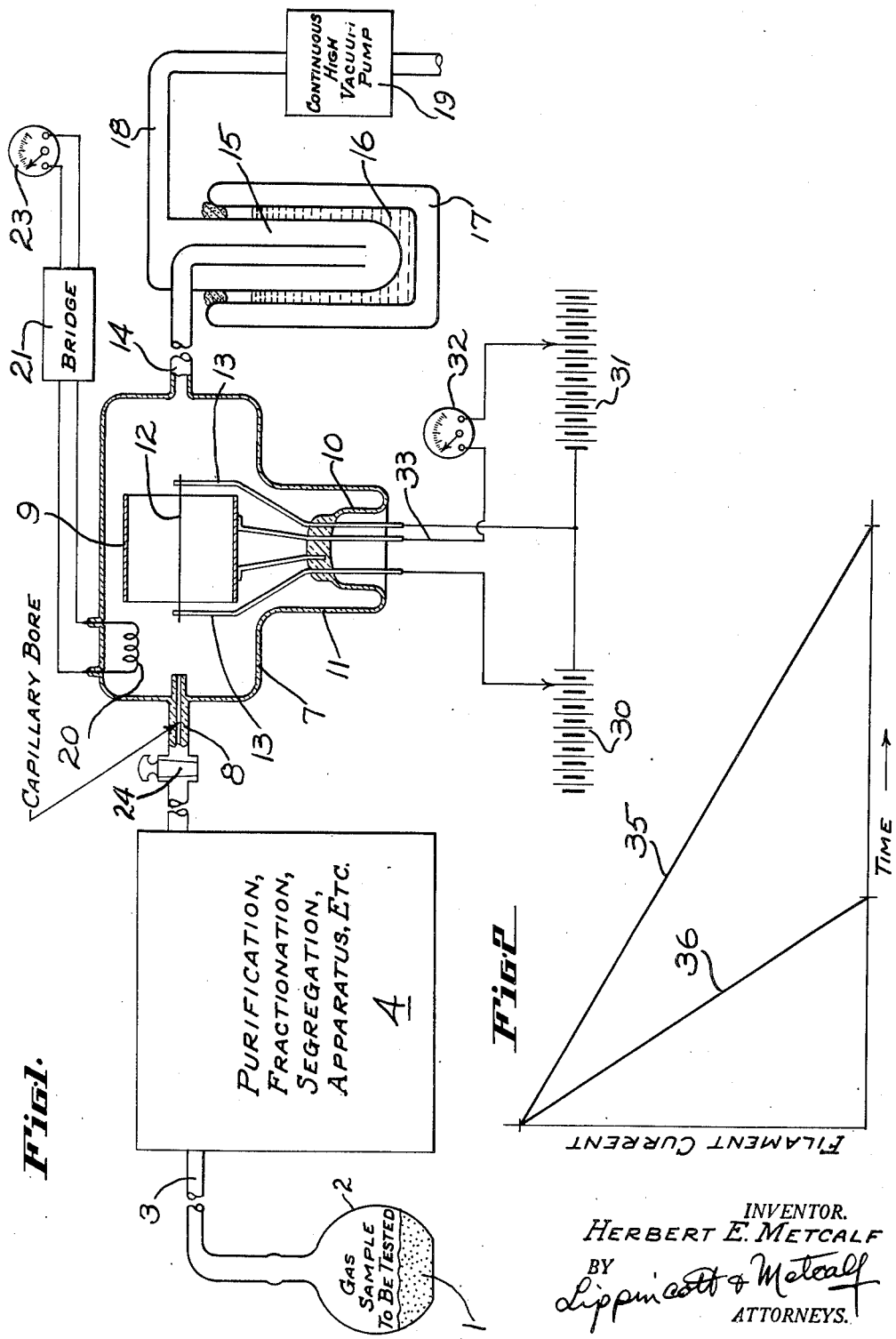

2,393,650

UNITED STATES PATENT OFFICE 2,393,650

APPARATUS FOR ANALYZING HYDROCARBONS

Herbert E. Metcalf, Walnut Creek, Calif., assignor to Consolidated Engineering Corporation, Pasadena, Calif., a corporation of California Application June 14, 1939, Serial No. 279,080

4 Claims. (Cl. 73—23)

My invention relates to a means of detecting and measuring hydrocarbons, and more particularly to a means ideally adapted for the detection of hydrocarbon gases contained in or recoverable from earth samples.

Among the objects of my invention are: To provide a means of detecting the presence of hydrocarbons in minute quantities; to provide a means of quantitatively determining the presence of hydrocarbon gas or substances producing hydrocarbon gas in earth samples, earth in place, or in water samples; to provide a means of measuring the amount of hydrocarbon gases recovered from samples containing only minute quantities of hydrocarbons; to provide a means of visually indicating minute quantities of hydrocarbon gas; to provide a means of testing earth samples taken at intervals along or beneath the surface of the ground for the purpose of detecting the presence or absence of hydrocarbons in the samples, and to provide a simple and efficient means of detecting the presence of minute quantities of hydrocarbon gas.

My invention possesses numerous other objects and features of advantage, some of which, together with the foregoing, will be set forth in the following description of specific apparatus embodying and utilizing my invention.

Referring to the drawing:

Fig. 1 is a diagrammatic view of one form of my invention, the thermionic tube forming a part thereof being shown in section.

Fig. 2 is a diagram showing electron emission decay curves indicating the presence of hydrocarbon gas in varying amounts.

I have found, in certain areas of the earth's surface, having beneath them what is commonly known as crude oil or natural petroleum deposits or accumulations, that due to pressure usually existing within these deposits, there is a continual seepage of hydrocarbon gas through or around the capping strata of the deposit, and that these gases will gradually migrate through the earth into the earth's surface layers. They may accumulate in the upper layers of the soil as waxes formed by oxidation and polymerization, or may be found in samples taken from below the water table. If a sufficiently sensitive indicating device is utilized, the presence of these hydrocarbons may be demonstrated and even measured.

Broadly speaking, the method of the present invention is to gather samples over areas suspected of overlying an oil deposit, and then subjecting these samples to an analysis whereby the presence or absence of various components or types of hydrocarbons can be determined, and whereby the hydrocarbon content of the samples can be measured.

Broadly, as to apparatus, my invention comprises means for enclosing samples taken from the earth after gathering them over suspected areas, together with means for subjecting the samples to treatment causing release of hydrocarbon gas therefrom, if present. The hydrocarbon gases, when segregated, are then exposed to a medium which reacts preferentially with the hydrocarbons, and means are provided to measure the resultant change in this medium. One preferred medium utilized is an electron emissive surface, and the resultant change in electron emission is measured to determine the presence of the hydrocarbon gas.

I have found that one preferred indicating device may utilize an electron emitting surface whose work function (electron emissivity) will be changed by contact with hydrocarbon gas. Variation in collected electron emission currents will then indicate the amount of gas present.

Samples for the detection of the lighter fractions, especially ethane $C_2H_6$ and ethylene $C_2H_4$ are preferably obtained from below the water table. When it is desired to determine the amount of waxes formed in the top soil by oxidation and polymerization, the surface soils are utilized for samples.

Ordinarily, methane should be removed, as it may be present as a result of the decomposition of organic matter. However, there are many types of soils where the methane, due to organic decomposition, is not present.

Although it is known that ethylene is a respiratory by-product of some organic matter, especially fruits, such a source of ethylene in the samples gathered may usually be disregarded or taken into account if present.

Samples may be collected therefore from either the top soil or the sub-soil. In the case of subsoil gas samples, three classes of samples may be obtained:

1. Soil samples;
2. Water samples;
3. Pure gas samples, by trapping of gases alone in containers lowered into boreholes.

I therefore do not wish to be limited in practicing my method to any particular type of sample or to any particular location where such samples are to be obtained, inasmuch as the detection processes to which I expose the gas from the samples operate irrespective of where or how the samples are gathered.

After the samples are gathered, a purification process can be applied to the gas content of the samples to remove such interferents as water vapor, oxygen, hydrogen, and some of the hydrocarbons themselves.

It will be obvious to those skilled in the art that purification processes heretofore known can be used to grossly separate the desired hydrocarbon gases from other gases. After gross purification, the gas from the samples can, if desired, be subjected to a fractionation treatment by temperature or diffusion, so that each fraction, if present, may be subjected to the indicating device. In this manner, by a comparison of the results attained, an indication of the relative concentration of the various hydrocarbon components can be obtained. It is not necessary to give here the exact purification treatment or the exact fractionation treatment to be given to the gas from the samples for the reason that the total gas content of samples will vary greatly in accordance with the manner in which the samples are obtained, and in accordance with the organic and inorganic content of the samples. However, those skilled in the art will readily understand the apparatus which is desirable for grossly separating and excluding gases other than the hydrocarbon gases present in the samples and for fractionating the remainder. In many cases, purification alone may be utilized and the grouped hydrocarbon gases remaining may be subjected to detection.

My invention may be more readily understood by direct reference to the drawing, and particularly to Fig. 1. Here, the sample 1 to be tested is preferably taken from areas suspected of overlying an oil deposit and may be taken, as explained above, either from the top soil or from the sub-soil below the water table. The samples may be, as explained, earth, water, or pure gas. However collected, the sample is then placed in a vacuum tight container 2, and sealed to vacuum line 3. A purifying and gas separation assembly 4 is inserted in the vacuum line, containing various reagents for the removal of unwanted gases such as, for example, the removal of water vapor by hydroscopic agents, and oxygen by agents easily oxidizable.

The resultant gases having been grossly freed from common diluants may then, if desired, be subjected to heat or diffusion in order to obtain fractionation tending to separate the various hydrocarbons if present. The output of the separation apparatus, with the outflowing gas having been subjected to fractionation or not as desired, is then passed directly into a vacuum tube envelope 7 through a capillary tube 8. Vacuum tube envelope 7 contains an anode 9 positioned coaxially with capillary tube 8, anode 9 being mounted on stem 10 sealed to a side arm 11 of envelope 7. A cathode or filament 12 is mounted on filament supports 13, to lie in the axis of anode 9. The end of envelope 7 opposite the entrance of capillary tube 8 is provided with an exhaust tubulation 14, leading into liquid air trap 15, cooled by liquid air 16 in vacuum container 17, as is customary in the art. Liquid air trap 15 is connected by vacuum line 18 to a continuous high vacuum pump 19 which may be, for example, a condensation pump of known character for obtaining a high vacuum.

A pressure gauge is utilized in order to continuously indicate pressure and one form of pressure gauge I have found to be satisfactory is a nickel filament 20 inserted in the envelope and forming one arm of a bridge 21 and giving a reading through a current indicator 23. Such a gauge is well known in the art.

Due to the fact that the heat radiation from the filament will change in accordance with the amount of gas in the envelope 7 and the resistance of the nickel filament changes with temperature, such a nickel filament can be utilized for direct and continuous reading of pressure within envelope 7.

To place the device in operation, the tube filament 12 is first sensitized for stable electron emission. I prefer to utilize a heated thoriated tungsten filament brought up to electron emitting condition in accordance with the teachings, for example, of the Langmuir United States Patent No. 1,244,216. In accordance with the general teachings of this patent, the thoriated filament 12 is first cleaned by being raised to a temperature of approximately 2900° K., in a high vacuum. The filament is then incandesced within the range of about 2000° K. to 2400° K., to cause thorium metal to migrate to the surface of the filament and to form thereon an efficient electron emitting layer which is thought to be mono-molecular in character. The filament is then lowered to a stable running temperature at around 1,700° K. It will be found that the electron emission at this temperature and after the described treatment, is stable in a high vacuum and is far greater in amount than can be obtained from tungsten alone. The temperature of the filament is controlled by filament battery 30 and positive anode potential is placed on anode 9 by anode battery 31, both batteries being variable. A milliammeter 32 is positioned in the anode circuit 33 in order to measure the electron emission from filament 12. I have found that filaments compounded with barium and strontium behave in similar manner, and are deemed full equivalents, these all providing low-work-function cathode surfaces.

At high vacuum, with the high vacuum pump continuously operating and filament 12 having its active surface formed to give a stable emission, and with the anode 9 energized to collect all of the emission of filament 12, stopcock 24 is operated to admit purified gas from the sample into envelope 7 through capillary tube 8, at a rate insufficient to cause substantial increase in anode current due to ion current. As the hydrocarbon molecules drift through envelope 7, they become ionized due to electron impact and the ions formed are attracted to filament 12 and come in contact with the emissive surface thereon.

I have found that hydrocarbon ions formed in this manner, have the property of greatly reducing the work function of an emissive surface formed in the manner described, and in consequence of this discovery, the electron emission from filament 12 will decay in, as far as I have been able to determine, substantially a linear relationship in accordance with the amount of hydrocarbon gas entering the tube. Thus, with a given capillary diameter, the rate of decay of the electron current will indicate the amount of hydrocarbon gas that is admitted to the tube. The pressure is continually controlled or measured, for each reading, and consequently the decay curves of the emission can be utilized to determine the amount of hydrocarbon gas present. Fractionating steps, if previously taken, may largely determine the type of hydrocarbon gas present.

For example, if the rate of decay of the electron current is fast, as indicated by curve 36 in Figure 2, then I have determined that the amount of hydrocarbon gas in the entering flow is relatively large. If the rate of decay of the electron current is relatively slow, as indicated by curve 35 in Figure 2, then I have found that the amount of hydrocarbon gas entering into envelope 7 is relatively small, pressure conditions remaining equal.

In all events, I have found that the rate of decay checked against pressure will indicate and measure the relative amount of hydrocarbon gas present. Thus, I have provided a device which will detect the amount of hydrocarbon gas entering the envelope 7 and I can therefore measure either hydrocarbon gas taken directly from the samples, or gases which have already been separated in their various constituents or fractions by chemical or physical means.

While I do not wish to be bound by any explanation herein given of the selective action of the hydrocarbon molecule on filament 12, it is believed by observation, that the hydrocarbon molecule, upon impacting the cathode or filament 12, changes the active emitting material so that it is not able to emit electrons in quantity at the temperature at which the filament 12 is being operated. Thus, in accordance with the number of the molecules accumulated, the emitting surface is reduced in effective area with each impact.

In support of this theory of operation, certain facts have been ascertained by experiment as follows: A tube once having a stable emitting surface established can be opened to the air and exposed directly to hydrocarbon gas so that some of the molecules are deposited directly on the thoriated surface. When the tube is thereafter evacuated, it will be found that upon bringing the filament up to temperature normally producing a stable electron emission that the electron emission of the filament exposed to hydrocarbon gas is greatly less than the emission from a similar tube exposed to air alone. It will be obvious to those skilled in the art that either the method previously described or the direct method of applying the gas just above described, can be utilized with the apparatus shown without great modification thereof.

After a determination has been made of the hydrocarbon gas existing in a sample, filament 12 may be cleaned of its contamination by being flashed again at around 2900° K., and a new thorium surface formed until the electron emission is again stabilized at a predetermined value. For this reason I prefer to utilize large diameter filaments in order to be able to regenerate a number of new surfaces before exhaustion of the thorium. A new sample is then substituted for the old sample in the vacuum line and the tests repeated. In this manner, a large number of samples may be investigated very rapidly for hydrocarbon content, and a suspected area of the earth may be rapidly surveyed. If it is found that certain samples grouped over a defined area contain definite concentrations of hydrocarbons or hydrocarbon gas as determined by the means and method outlined above, then the results thus obtained may be utilized, for example, for the purpose of drilling for oil in the area defined.

As an alternate method, capillary bore 8 may be dispensed with and a larger bore provided. Air may then be passed at low vacuum or at atmosphere over the sample to be tested, and this air passed directly over filament 12 in unheated condition for a given length of time by a low vacuum pump. Filament 12 under these conditions may be, if desired, of close mesh design to make extended contact with the air flow.

After a given length of time has elapsed stopcock 24 may be shut off, the tube evacuated and the filament emission tested. The difference between the emission from a thoriated filament exposed to normal air and the emission from the filament exposed to the air supposedly containing hydrocarbon gas, will then be the measurement of the hydrocarbon gas emanating from the sample. I have found both of these methods to give results, although I prefer the method first above described. The latter method, however, is useful in the field by collecting air from boreholes and passing it directly over the cold filament.

I claim:

1. Apparatus for analyzing hydrocarbon gas, comprising a test chamber; an anode and a cathode with a gas-sensitive, low-work-function surface, located in said chamber; means for measuring the electron emission from said cathode; means for measuring the pressure within said chamber; means for feeding a stream of hydrocarbon gas to be tested into said chamber; and means for creating a high degree of vacuum in said chamber.

2. Apparatus for analyzing hydrocarbon gas, comprising a test chamber; an anode and a gas-sensitive thoriated cathode, located in said chamber; means for measuring the electron emission from said cathode; means for measuring the pressure within said chamber; means for feeding a stream of hydrocarbon gas to be tested into said chamber; and means for creating a high degree of vacuum in said chamber.

3. Apparatus for analyzing hydrocarbon gas, comprising a test chamber; an anode and a gas-sensitive cathode compounded with barium, located in said chamber; means for measuring the electron emission from said cathode; means for measuring the pressure within said chamber; means for feeding a stream of hydrocarbon gas to be tested into said chamber; and means for creating a high degree of vacuum in said chamber.

4. Apparatus for analyzing hydrocarbon gas, comprising a test chamber; an anode and a gas-sensitive cathode compounded with strontium, located in said chamber; means for measuring the electron emission from said cathode; means for measuring the pressure within said chamber; means for feeding a stream of hydrocarbon gas to be tested into said chamber, and means for creating a high degree of vacuum in said chamber.

HERBERT E. METCALF.